United States Patent
Yamamoto

(10) Patent No.: US 7,183,691 B2
(45) Date of Patent: Feb. 27, 2007

(54) CONTROL APPARATUS FOR VIBRATION TYPE ACTUATOR AND CONTROL METHOD THEREOF

(75) Inventor: Shinji Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 10/940,719

(22) Filed: Sep. 15, 2004

(65) Prior Publication Data

US 2005/0067921 A1 Mar. 31, 2005

(30) Foreign Application Priority Data

Sep. 25, 2003 (JP) ............... 2003-334186

(51) Int. Cl.
*H01L 41/08* (2006.01)
(52) U.S. Cl. .............................. 310/316.01
(58) Field of Classification Search ......... 310/316.01, 310/316.02, 317, 319; 318/116–118
See application file for complete search history.

(56) References Cited

U.S. PATENT DOCUMENTS

| | | | | |
|---|---|---|---|---|
| 4,926,084 A | * | 5/1990 | Furutsu et al. | 310/316.02 |
| 4,954,741 A | * | 9/1990 | Furutsu et al. | 310/316.02 |
| 5,508,579 A | * | 4/1996 | Suganuma | 310/316.02 |
| 5,612,598 A | * | 3/1997 | Fukui et al. | 318/116 |
| 5,616,979 A | * | 4/1997 | Nishikawa | 310/316.02 |
| 5,744,897 A | * | 4/1998 | Takagi et al. | 310/316.02 |
| 6,100,654 A | | 8/2000 | Izukawa et al. | 318/114 |
| 6,215,224 B1 | | 4/2001 | Kataoka et al. | 310/316.02 |
| 6,229,402 B1 | | 5/2001 | Kataoka et al. | 331/34 |
| 2004/0124742 A1 | | 7/2004 | Takemura et al. | 310/317 |
| 2005/0046363 A1 | | 3/2005 | Yamamoto | 318/114 |

FOREIGN PATENT DOCUMENTS

| | | |
|---|---|---|
| JP | 11-168888 | 6/1999 |
| JP | 2000-032783 | 1/2000 |
| JP | 2002-305884 | 10/2002 |

* cited by examiner

*Primary Examiner*—Mark Budd
(74) *Attorney, Agent, or Firm*—Fitzpatrick, Cella, Harper & Scinto.

(57) ABSTRACT

There are provided a control apparatus for a vibration type actuator and a control method thereof, which are capable of efficiently driving the vibration type actuator regardless of changes in characteristic of the vibration type actuator, in load, and in characteristic of a circuit for generating a periodic signal, thereby minimizing power consumption. The control method includes the steps of detecting a vibration state of an elastic member in the actuator, detecting a phase difference between the periodic signal applied to the actuator or a signal for generating the periodic signal and a detection signal indicating the vibration state, and controlling the frequency and voltage of the periodic signal. The controlling step includes controlling the voltage of the periodic signal based on the detected phase difference.

12 Claims, 12 Drawing Sheets

FIG. 5

| A+ OR B+ | A− OR B− | out1 | out2 |
|---|---|---|---|
| L | L | L | L |
| H | L | H | L |
| L | H | L | H |
| H | H | − | − |

CONTROL APPARATUS FOR VIBRATION TYPE ACTUATOR AND CONTROL METHOD THEREOF

BACKGROUND OF THE INVENTION

1. Field of the Invention

The present invention relates to control of a vibration type actuator which is referred to as an ultrasonic motor or the like, and excites vibration in an elastic member by applying a periodic signal to an electromechanical energy conversion element, thereby relatively driving the elastic member and a contact member which is in contact with the elastic member.

2. Related Background Art

Up to now, a proposal for reducing the power consumption of a vibration type actuator has been made in U.S. Pat. No. 6,100,654 and the like. According to the proposal, when the drive frequency of a vibration type motor is controlled, in a frequency region where a drive speed of the vibration type motor is low, a drive voltage is reduced or the pulse width of a pulse signal inputted to a drive circuit is narrowed, thereby improving the efficiency.

However, in a method of controlling the drive voltage or the pulse width according to a frequency region, which is proposed in U.S. Pat. No. 6,100,654 described above, there are the following problems.

1. With respect to the drive voltage or the pulse width of the pulse signal, which is set in the frequency region where the drive speed is low, the drive voltage or the pulse width of the pulse signal is set with a margin (so as not to stop driving) in the frequency region where the drive speed is low in view of a variation in performance of the vibration type actuator. Therefore, the power consumption cannot be sufficiently reduced.

2. The frequency and voltage of a periodic signal necessary to drive the vibration type actuator at target speed are changed according to a size of a load driven by the vibration type motor and use environments such as a temperature and a humidity. Therefore, when the drive voltage or the pulse width is set with a margin with respect to a variation in load and variations in use environments, the power consumption cannot be sufficiently reduced as described above.

3. According to an individual difference between parts (capacitor, coil, and the like) composing a circuit for generating the periodic signal applied to the vibration type motor and a variation in characteristic resulting from the use environments, the voltage (amplitude) of the periodic signal generated by the circuit varies. Therefore, it is hard to always perform driving with high efficiency.

SUMMARY OF THE INVENTION

An object of the present invention is to provide a control apparatus for a vibration type actuator and control method thereof, which are capable of efficiently driving the vibration type actuator regardless of changes in characteristic of the vibration type actuator, in load, and in characteristic of a circuit for generating a periodic signal, thereby minimizing power consumption.

To solve the above problems, according to one aspect of the present invention, there is provided a control apparatus for a vibration type actuator, which excites vibration in an elastic member to relatively drive the elastic member and a contact member which is in contact with the elastic member by applying a periodic signal to an electromechanical energy conversion element, the control apparatus including: a signal generation unit adapted to generate the periodic signal; a vibration detection unit adapted to detect a vibration state of the elastic member; a phase difference detection unit adapted to detect a phase difference between the periodic signal generated by the signal generation unit and an output signal from the vibration detection unit; and a control unit adapted to control a frequency and a voltage of the periodic signal generated by the signal generation unit, in which the control unit controls the voltage of the periodic signal based on the phase difference detected by the phase difference detection unit.

To solve the above problems, according to another aspect of the present invention, there is provided a method of controlling a vibration type actuator, which excites vibration in an elastic member to relatively drive the elastic member and a contact member which is in contact with the elastic member by applying a periodic signal to an electromechanical energy conversion element, the method including the steps of: detecting a vibration state of the elastic member; detecting a phase difference between one of the periodic signal and a signal for generating the periodic signal and a detection signal indicating the vibration state; and controlling a frequency and a voltage of the periodic signal, in which the controlling step includes controlling the voltage of the periodic signal based on the detected phase difference.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a truth table showing a relationship between an input and an output of the driver circuit;

DETAILED DESCRIPTION OF THE PREFERRED EMBODIMENTS

Hereinafter, embodiments of the present invention will be described with reference to the drawings.

First Embodiment

Figure 2:
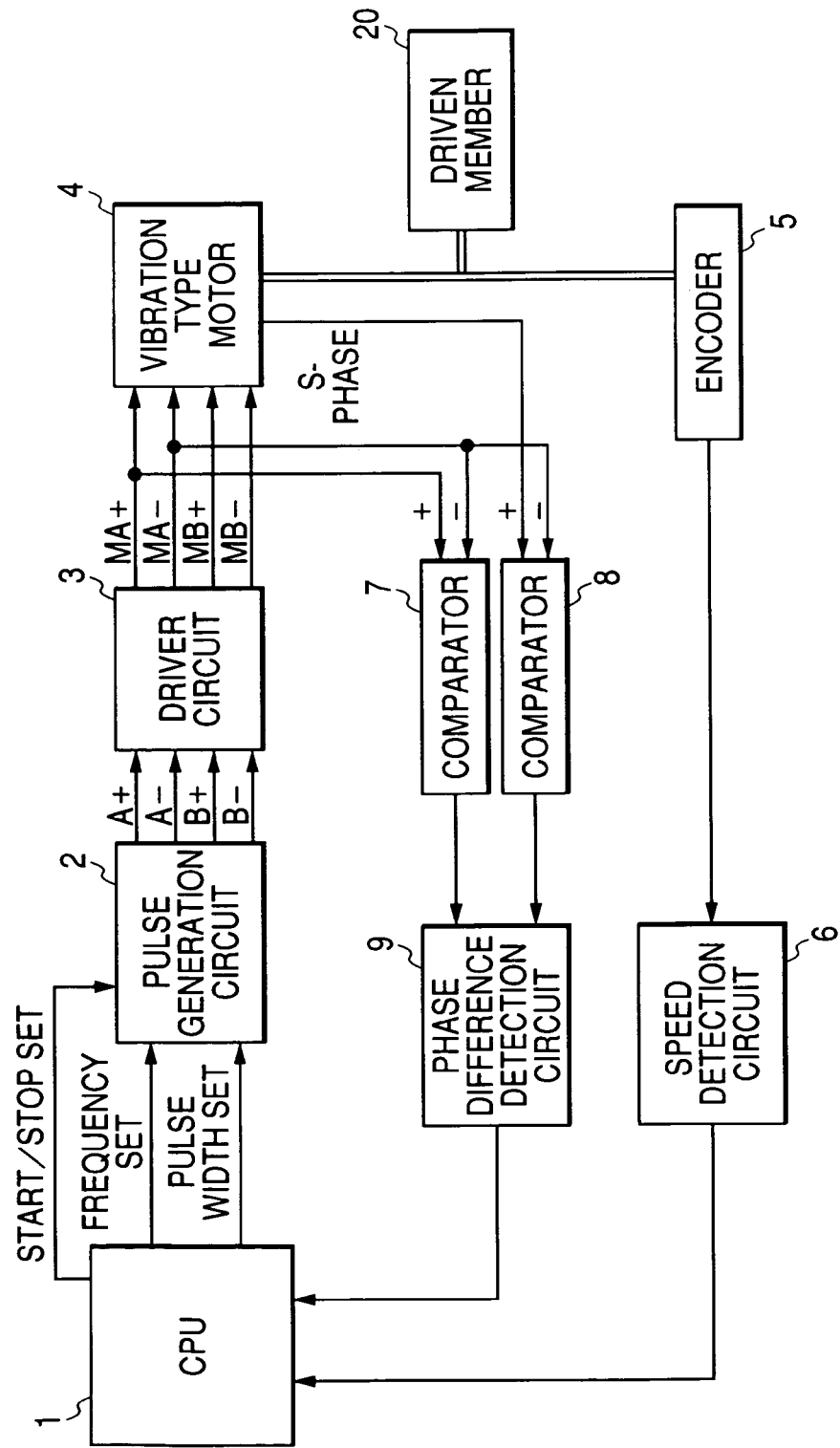
FIG. 2 is a block diagram showing the control circuit according to the first embodiment.

FIG. 2 shows the structure of a control circuit for a vibration type motor according to a first embodiment of the present invention. In FIG. 2, a CPU 1 serves as a controller for controlling a vibration type motor 4 and determines a pulse width corresponding to a drive frequency and an applied voltage amplitude according to speed information and phase difference information which are described later. The CPU 1 also performs setting of the start and stop operation of the vibration type motor 4. A control flow executed by the CPU 1 will be described later in detail.

Figure 13A:
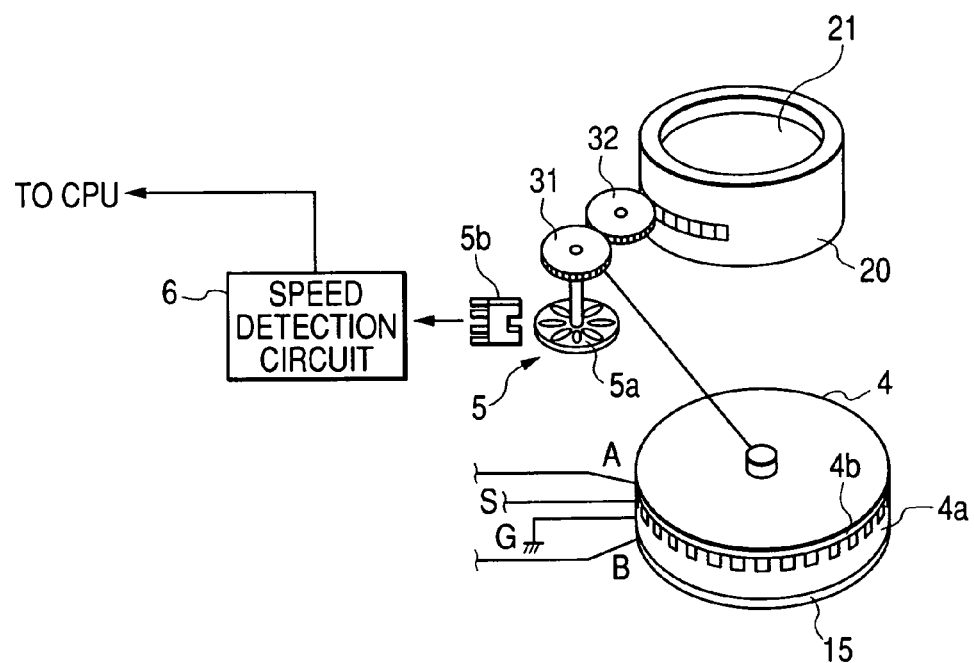
FIGS. 13A and 13B show an example with respect to the arrangement and polarization state of a piezoelectric element in the vibration type motor.
Figure 13B:
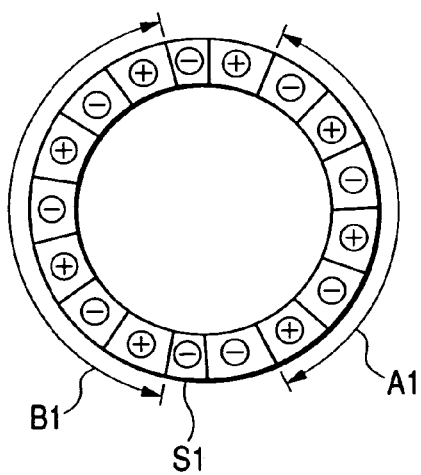

For example, as shown in FIG. 13A, the vibration type motor 4 includes: a vibration member in which a piezoelectric element (electromechanical energy conversion element) 15 is bonded to an elastic member (stator) 4a made of metal or the like; and a contact member (rotor) 4b pressed to the elastic member 4a by a spring force or the like. Plural phases of periodic signals A and B are applied to the piezoelectric element 15 to produce a traveling wave on the surface of the elastic member 4a. Therefore, the elastic member 4a and the contact member 4b are relatively driven by the friction therebetween. FIG. 13 shows an example with respect to the arrangement and polarization state of the piezoelectric element bonded to the elastic member formed in a ring shape. Reference A1 denotes a piezoelectric element group to which an A-phase periodic signal is applied and B1 denotes a piezoelectric element group to which a B-phase periodic signal is applied. Reference S1 denotes a piezoelectric element corresponding to a sensor phase (reference S in FIG. 13A).

In FIG. 2, a driven member 20 is driven by the vibration type motor 4. Specific examples of the driven member 20 include: a lens drive mechanism for an image taking lens device; a photosensitive drum for a copy machine and a paper feed mechanism therefor; and a robot arm. FIG. 13A shows an example in the case where an output of the vibration type motor 4 is transferred to a lens barrel serving as the driven member 20 holding a lens 21 through gears 31 and 32 to drive the lens barrel.

Figure 3:
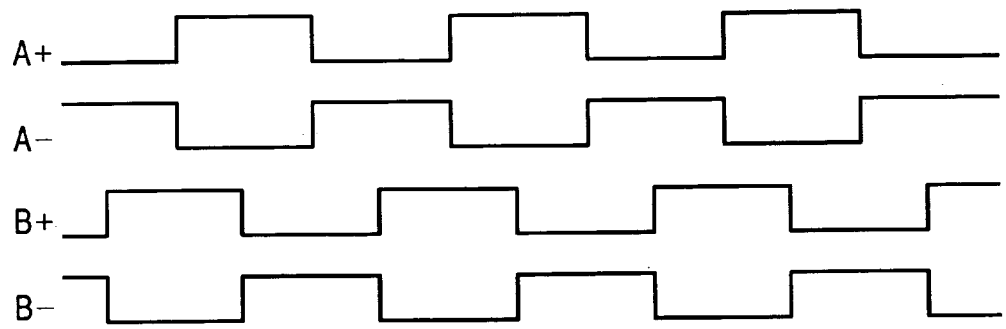
FIG. 3 is a waveform diagram showing signals outputted from a pulse generation circuit.

A pulse generation circuit 2 in FIG. 2 generates four pulse signals A+, A−, B+, and B− having the same frequency as shown in FIG. 3 based on a drive frequency set value, a pulse width set value, and a start and stop command, which are outputted from the CPU 1. The four pulse signals A+, A−, B+, and B− are inputted to the driver circuit 3.

Figure 4:
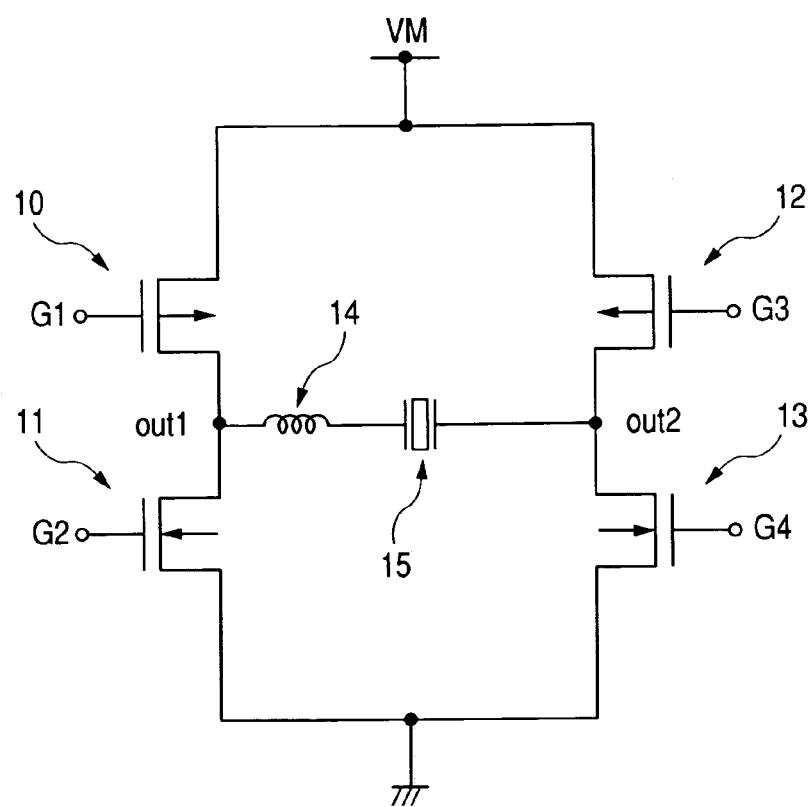
FIG. 4 is a circuit diagram showing a driver circuit.

FIG. 4 shows an example of the driver circuit 3. The driver circuit 3 includes: an H bridge circuit composed of an FETs 10, 11, 12, and 13 serving as switching elements; and a step-up coil 14.

In FIG. 4, reference numeral 15 denotes a piezoelectric element of the vibration type motor 4. The vibration type motor in this embodiment is a motor for generating a traveling wave by a combination of two kinds of vibration modes. Here, the two kinds of vibration modes are referred to as an A-mode and a B-mode. The circuit shown in FIG. 4 is a circuit that supplies a voltage for generating one of the two kinds of vibration modes. Therefore, in actual, two driver circuits such as an A-mode driver circuit and a B-mode driver circuit are provided.

In FIG. 4, the four FETs 10, 11, 12, and 13 are operated in accordance with levels of the pulse signals outputted from the pulse generation circuit 2.

Figure 5:
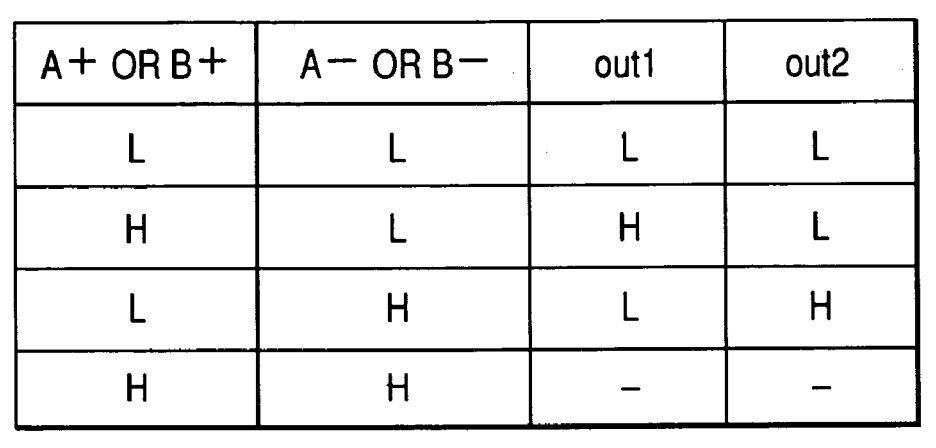

FIG. 5 is a truth table showing a relationship between the levels of the four pulse signals inputted from the pulse generation circuit 2 to the driver circuit 3 and levels of signals out1 and out2 outputted from the driver circuit 3. In FIG. 5, two columns to the left indicate logical values of the inputted pulse signals. The input signals become A+ and A− in the A-mode driver circuit and B+ and B− in the B-mode driver circuit. Hereinafter, the case of the A-mode will be described.

When each of the input pulse signals A+ and A− is an L level, the FETs 11 and 13 become an ON state and the FETs 10 and 12 become an OFF state. Therefore, each of the output signals out1 and out2 becomes the L level because the output terminals of the driver circuit 3 are connected with a ground.

When the input pulse signal A+ is an H level and the input pulse signal A− is the L level, the FETs 10 and 13 become the ON state and the FETs 11 and 12 become the OFF state. Therefore, the output signal out1 becomes the H level and the output-signal out2 becomes the L level, so that a voltage is applied to the piezoelectric element 15.

When the input pulse signal A+ is the L level and the input pulse signal A− is the H level, the FETs 11 and 12 become the ON state and the FETs 10 and 13 become the OFF state. Therefore, the output signal out1 becomes the L level and the output signal out2 becomes the H level, so that an inverted voltage is applied to the piezoelectric element 15. Note that a state in which each of the input pulse signals A+ and A− becomes the H level does not occur in the pulse generation circuit 2.

In the above-mentioned structure, a voltage amplitude (hereinafter merely referred to as a voltage) of the periodic signal outputted to the piezoelectric element 15 of the vibration type motor 4 can be changed by changing the pulse widths of the four pulse signals inputted from the pulse generation circuit 2 to the driver circuit 3.

An inductance of the coil 14 is selected such that a series resonant frequency of a circuit which is composed of an electrostatic capacitor in the piezoelectric element 15 of the vibration type motor 4 and the coil 14 connected with the piezoelectric element 15 becomes a frequency close to the frequency of the periodic signal (hereinafter referred to as a drive frequency). Therefore, a step-up voltage is applied to the piezoelectric element 15.

In this embodiment, plural groups of electrodes are bonded to the piezoelectric element. Here, A-mode electrodes are referred to as MA+ and MA− and B-mode electrodes are referred to as MB+ and MB−. When the A-mode vibration is caused, voltages are applied to the electrodes MA+ and MA−. When the B-mode vibration is caused, voltages are applied to the electrodes MB+ and MB−. The output signal out1 of the A-mode driver circuit is applied to the electrode MA+ and the output signal out2 thereof is applied to the electrode MA−. Similarly, the output signal out1 of the B-mode driver circuit is applied to the electrode MB+ and the output signal out2 thereof is applied to the electrode MB−.

In this embodiment, in order to estimate the proximity of the drive frequency of the vibration type motor 4 to the resonant frequency, a phase difference between an applied voltage (periodic signal) and a signal indicating a vibration state of the elastic member, which is obtained from the sensor phase piezoelectric element, is measured.

More specifically, in order to measure the phase difference with a phase difference detection circuit 9 which is a digital circuit, the applied voltage and the vibration state of the elastic member are converted into pulse signals using comparators 7 and 8. At this time, the voltage applied to the electrode MA−, serving as a reference signal, is inputted to a negative input terminal of each of the comparators 7 and 8. The phase difference detection circuit 9 measures, as phase difference information, a period from the rise edge of a pulse signal produced from the applied voltage to the rise edge of a pulse signal indicating the vibration state. The measured phase difference information is inputted to the CPU 1.

As shown in FIG. 2, an encoder 5 for detecting a speed and a position is bonded to the vibration type motor 4. The encoder 5 outputs a pulse signal corresponding to a rotation state of the vibration type motor 4. FIG. 13A shows an example of the encoder 5 which is composed of: a pulse plate 5*a* integrally rotated with the gear 31; and a photo interrupter 5*b* including a light transmitting portion and a light receiving portion which are arranged to sandwich the pulse plate 5*a*.

A speed detection circuit 6 measures, as drive speed information, a period of the pulse signal outputted from the encoder 5 to detect a drive speed (the number of revolutions) of the vibration type motor. The measured drive speed information is inputted to the CPU 1.

The CPU 1 controls the drive frequency and the pulse width (that is, the voltage of the periodic signal) based on the phase difference information obtained from the phase difference detection circuit 9 and the drive speed information obtained from the speed detection circuit 6.

Figure 6:
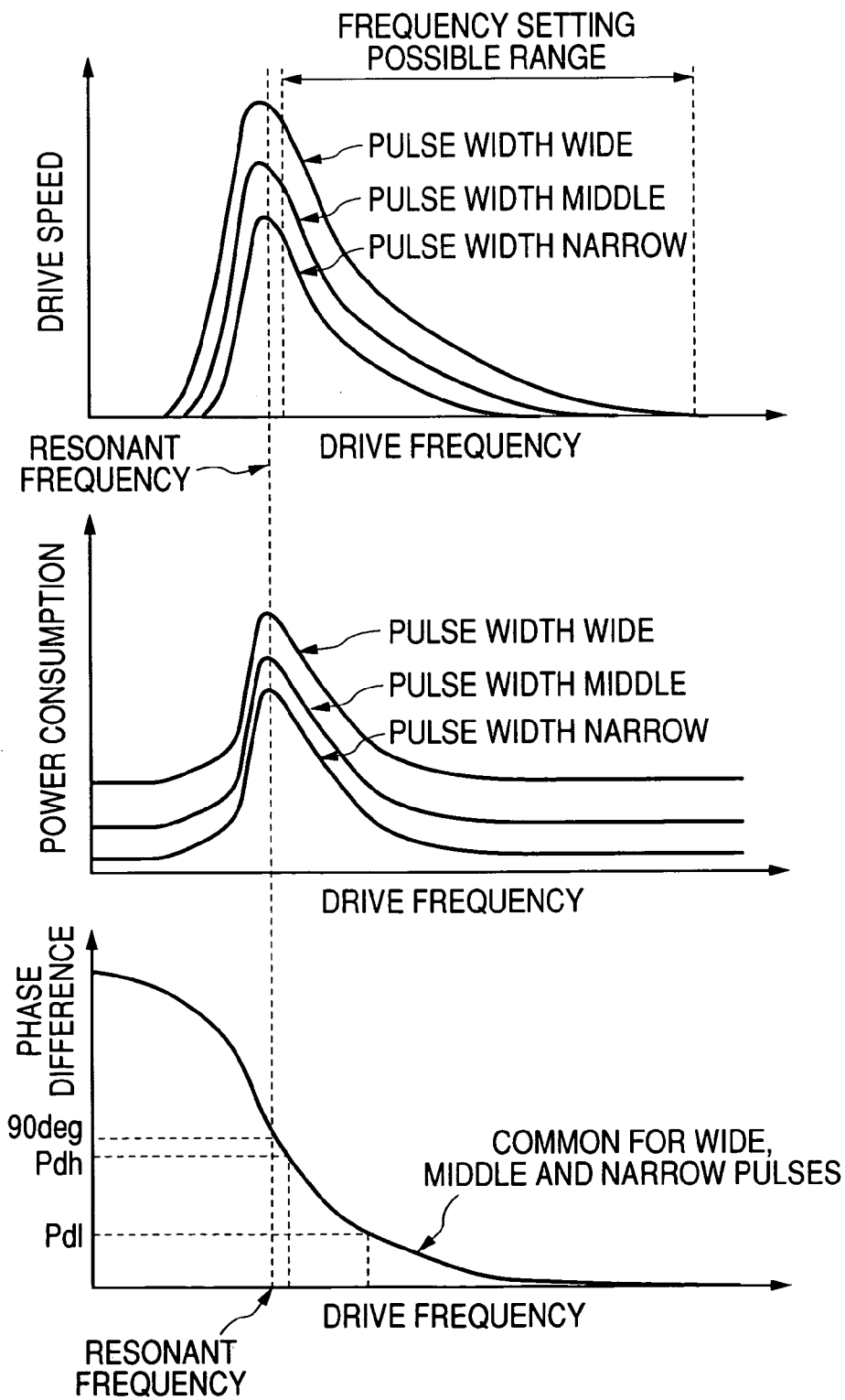
FIG. 6 is a graph showing characteristics of a speed, power, and a phase difference with respect to a drive frequency in a vibration type motor.

FIG. 6 shows a relationship between the drive frequency of the vibration type motor 4 and the drive speed thereof in the case where the pulse width is used as a parameter. As shown in FIG. 6, according to a curve of the drive speed of the vibration type motor 4, the drive speed peaks at the resonant frequency. In the lower frequency side than the resonant frequency, a change of the drive speed to a change of the drive frequency is large. Therefore, the drive frequency is generally controlled within the higher frequency region than the resonant frequency (indicated as "a frequency setting possible range" in FIG. 6). When the pulse width is increased (a vibration displacement of the vibration type motor is increased), the resonant frequency tends to slightly reduce.

With respect to the relationship with the pulse width, a maximum speed reduces as the pulse width becomes narrower (that is, the voltage becomes lower).

FIG. 6 also shows a relationship between the drive frequency and the power consumption in the case where the pulse width is used as a parameter. As is apparent from FIG. 6, the power consumption increases as the pulse width becomes wider (that is, the voltage becomes higher). In particular, in a low speed region in which the drive frequency is high, as is apparent from the relationship between the drive frequency and the power consumption, the waste power consumption increases as the pulse width becomes wider. Thus, when the vibration type motor 4 is driven with a narrow pulse width, the consumption power is small and the efficiency is high. In particular, these are significant in the low speed region in which the drive frequency is high.

FIG. 6 further shows a relationship between the drive frequency and the phase difference obtained from the phase difference detection circuit 9 in the case where the pulse width is used as a parameter. With respect to the relationship between the drive frequency and the phase difference, substantially the same characteristic is obtained regardless of the pulse width. Therefore, the proximity of the drive frequency to the resonant frequency can be apparent with reference to the phase difference. As shown in FIG. 6, the phase difference becomes 0° in a non-drive state and 90° at the resonant frequency (in a resonant drive state).

As is apparent from the above-mentioned characteristic, the frequency control is performed according to the drive speed and simultaneously the pulse width is controlled according to the phase difference obtained form the phase difference detection circuit 9. Therefore, even if a voltage of the periodic signal varies owing to a variation in characteristic of the vibration type motor, a change of a load state, a variation in characteristic of the coil 14 in the driver circuit 3, or the like, driving can be performed with high efficiency. Control contents executed by the CPU 1 to realize such driving will be described below with reference to a flow chart shown in FIG. 1.

Figure 1:
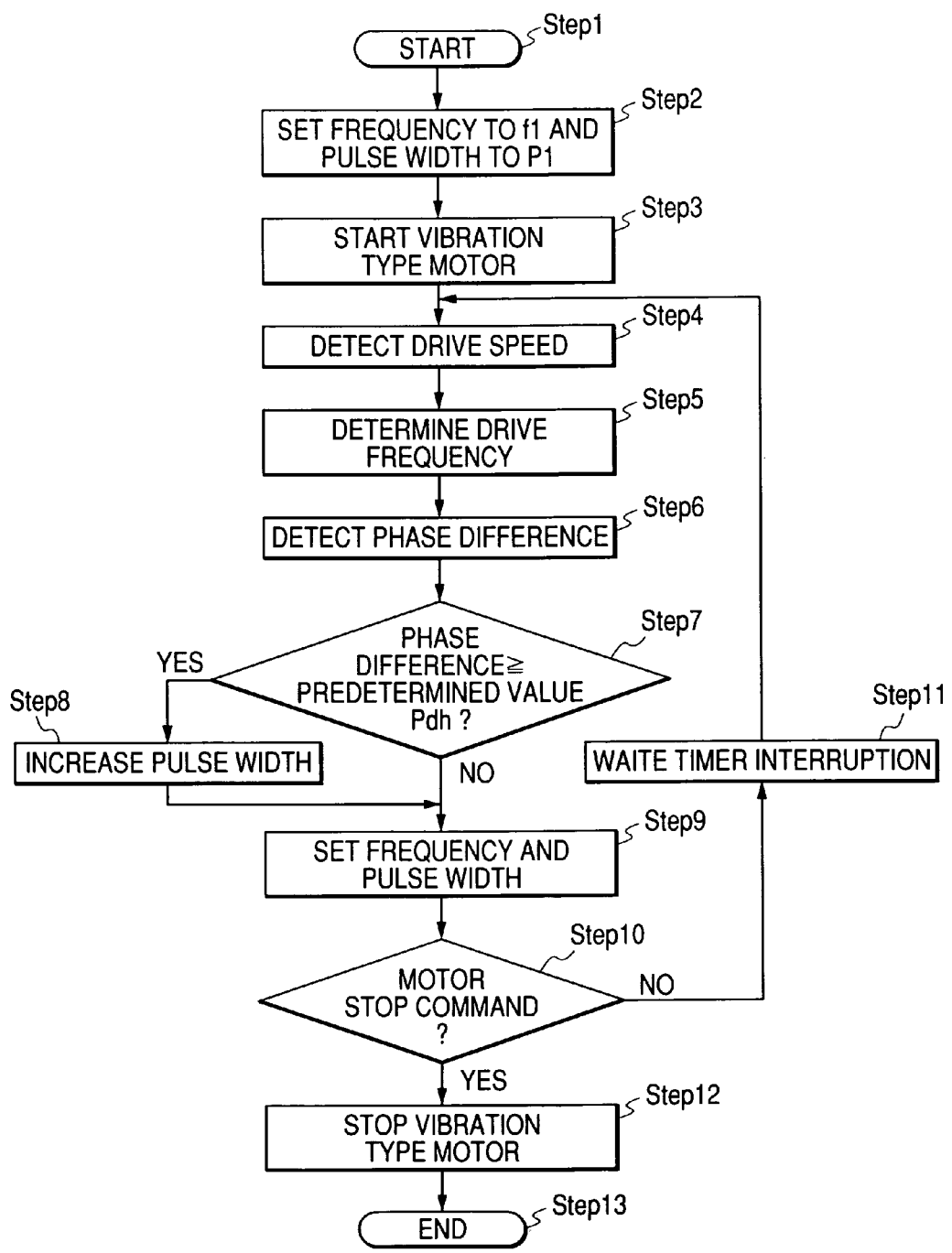
FIG. 1 is a flow chart showing a control procedure of a control circuit according to a first embodiment of the present invention.

In FIG. 1, when this flow is started in Step 1, the CPU 1 sets a drive frequency f1 at start and a pulse width P1 (first voltage of the periodic signal) at start to the pulse generation circuit 2 in Step 2. Here, the drive frequency f1 at start is set to a value sufficiently higher than the resonant frequency of the vibration type motor 4. As described above, the frequency control of the vibration type motor 4 assumes to use the high frequency region than the resonant frequency. Therefore, in order to surely drive the vibration type motor 4 at a high frequency than the resonant frequency even if a condition such as a temperature changes, the drive frequency f1 at start is set to the above-mentioned value.

The pulse width P1 at start is set to a minimum value. The pulse width P1 may be such a narrow pulse width that the drive speed cannot reach an ultimate target speed even when the vibration type motor 4 is driven at the resonant frequency. This is because the power consumption of the vibration type motor 4 is minimized. In particular, because the vibration type motor 4 is driven at the high drive frequency, narrowing the pulse width at driving has a large effect of reducing the power consumption.

Next, in Step 3, a start command for the vibration type motor 4 is outputted to the pulse generation circuit 2.

Next, in Step 4, the drive speed information on the vibration type motor 4 is detected from the speed detection circuit 6. In Step 5, the drive frequency is determined based on the drive speed information.

In this embodiment, the drive frequency is determined by: multiplying a difference between the drive speed and the target speed by a predetermined control gain; and adding the resultant value to the drive frequency.

When a drive frequency before the determination is given by fc, a target speed is given by Vp, a detected drive speed is given by Vc, and a control gain is given by G, a newly set drive frequency fn is obtained by the following expression.

$$fn = fc + G \cdot (Vc - Vp)$$

Next, in Step 6, the phase difference information is detected from the phase difference detection circuit 9. In Step 7, whether or not the phase difference information is equal to or larger than a predetermined value (first phase difference) Pdh is determined. Here, as shown in FIG. 6, Pdh is set to a value obtained from the phase difference detection circuit 9 when the vibration type motor 4 is driven at a slightly high frequency than the resonant frequency. That is, Pdh is a phase difference indicating a drive state closer to the resonant drive state of the vibration type motor 4 than the non-drive state thereof.

Whether or not the vibration type motor 4 is driven at a frequency close to the resonant frequency can be detected from the determined result. When the vibration type motor 4 is driven at a frequency close to the resonant frequency (that is, when the phase difference is a value indicating a low frequency drive state closer to the resonant drive state than the drive state indicated by Pdh), the vibration type motor 4 is driven with a state in which an increase margin of the drive frequency necessary to drive the vibration type motor 4 at the target speed is small (drive frequency substantially reaches the lower limit of the frequency setting possible range).

When it is determined that the increase margin is small, in Step 8, the pulse width set to the pulse generation circuit 2 is increased from the current pulse width P1 by a predetermined pulse width. In addition, in Step 9, the pulse width determined in Step 8 and the drive frequency determined in Step 5 are set to the pulse generation circuit 2. Therefore, the voltage of the periodic signal becomes higher.

As shown in FIG. 6, when the pulse width (voltage) increases, the vibration type motor 4 is driven with a state in which the maximum number of revolutions is higher. Therefore, the resonant frequency slightly reduces, so that the increase margin of the drive frequency becomes larger. Note that the upper limit of the pulse width is set to 50% in duty ratio.

When it is determined in Step 7 that the phase difference information is smaller than Pdh (that is, the phase difference is a value indicating a high frequency drive state farther away from the resonant drive state than the drive state indicated by Pdh), the vibration type motor 4 is not driven at a frequency close to the resonant frequency. The flow of the processing goes to Step 9 and the pulse width P1 set in Step 2 and the drive frequency determined in Step 5 are set to the pulse generation circuit 2.

In Step 10, it is detected whether or not a motor stop command for the vibration type motor 4 is outputted from a circuit (not shown) provided outside the CPU 1 or produced by another program in the CPU 1 (for example, the case where the CPU 1 also serves as a main controller for a device using the vibration type motor 4 as a drive source). When the motor stop command is not outputted or produced, the flow of the processing goes to Step 11. In this embodiment, the operation of the vibration type motor 4 is controlled every predetermined cycle in response to a timer interruption of the CPU 1. Therefore, in Step 11, the operation is temporarily stopped until a next timer interruption timing. When the motor stop command is outputted and produced in Step 10, the vibration type motor 4 is stopped in Step 12.

According to the above-mentioned control, the vibration type motor 4 can be driven with a relatively narrow pulse width, that is, a relatively small voltage of the periodic signal, so that, in particular, the waste power consumption can be reduced in the low speed region. In addition, the phase difference between the periodic signal applied to the piezoelectric element and the signal indicating the vibration state of the elastic member, which is obtained from the sensor phase piezoelectric element, is measured. Therefore, even if a variation in characteristic of the vibration type motor, an increase in load, or a variation in inductance of the step-up coil 14 occurs, whether or not the vibration type motor is in the resonant drive state can be accurately determined. Further, in the case where the drive speed cannot be increased to the target speed using the pulse width at start even when the drive frequency is reduced to a lower limit frequency which is settable, the pulse width is widened and the voltage of the periodic signal is increased. Therefore, it is possible to drive the vibration type motor 4 with an optimum pulse width. The pulse width is widened only when it is determined that the frequency of the periodic signal cannot be further reduced based on a measurement of the phase difference. Accordingly, the voltage value of the periodic signal can be minimized.

In this embodiment, the drive frequency and the pulse width are controlled by software stored in the CPU. However, the present invention is not limited to this and therefore any structure for realizing the above-mentioned control contents may be used. For example, complex control may be performed in which the speed control is performed by hardware such as a digital circuit and the phase difference detection and the pulse width control are performed by software. All operations may be performed by a digital circuit.

In this embodiment, in order to detect the drive state of the vibration type motor (vibration state of the elastic member), the phase difference between the periodic signal and the signal outputted from the sensor phase piezoelectric element of the vibration type motor is used. However, the present invention is not limited to this. A phase difference between a voltage and a current of the periodic signal applied to the vibration type motor may be used. In this case, a current detector for detecting the current may be used as a vibration detection unit in claim and a phase difference between a signal from the current detector and a voltage signal generated by a signal generation unit may be detected.

Second Embodiment

Figure 7:
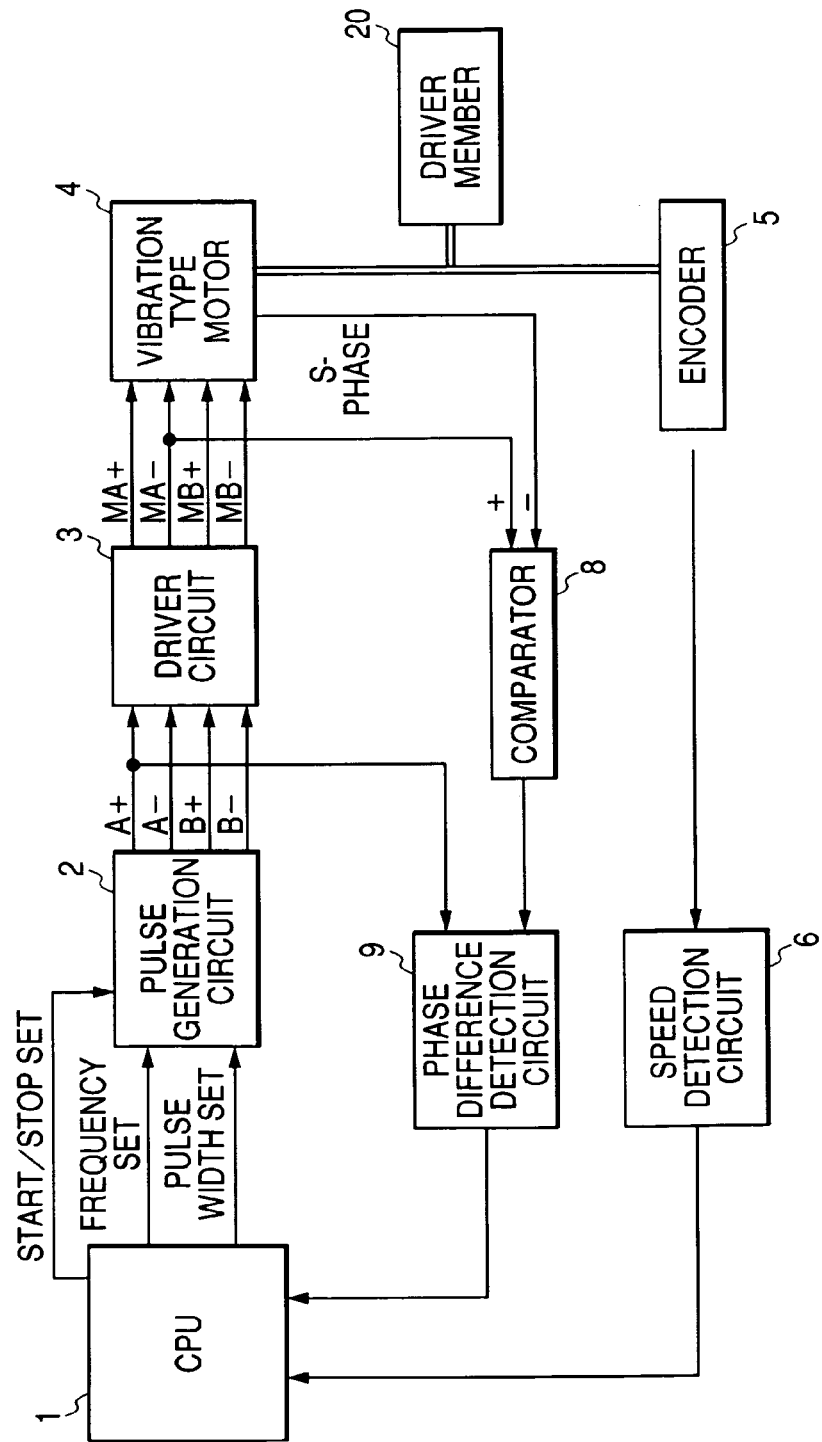
FIG. 7 is a block diagram showing a control circuit according to a second embodiment of the present invention.

FIG. 7 shows the structure of a control circuit for a vibration type motor according to a second embodiment of the present invention. In this embodiment, the same references are provided for constituent elements common to those in the first embodiment, and the detail descriptions are omitted here.

In this-embodiment, the circuit shown in FIG. 2, which is described in the first embodiment, is improved. A point different from the first embodiment is that the comparator 7 for converting the voltage applied to the piezoelectric element 15 into the pulse signal is omitted and the pulse signal A+ outputted from the pulse generation circuit 2 is used for phase difference detection. In addition, the input terminals of the comparator 8 are reversed to each other such that the polarity of the pulse signal outputted from the comparator 8 is opposed to that in the first embodiment. According to such an arrangement, a circuit structure becomes simpler than that in the first embodiment. A purpose that the polarity of the pulse signal is reversed will be described later.

Figure 8:
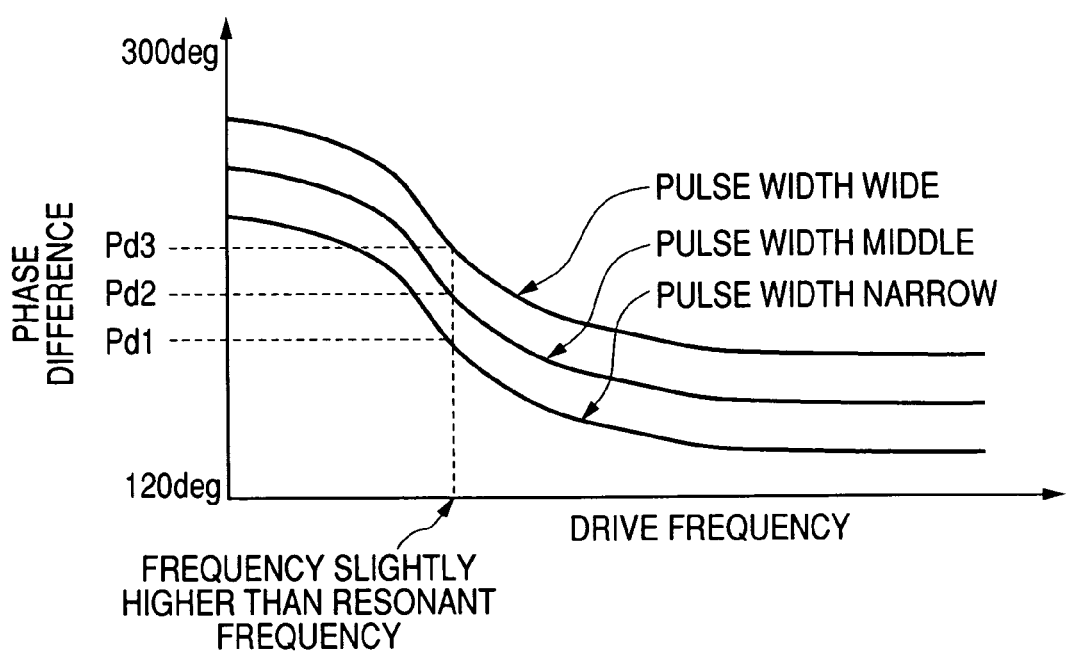
FIG. 8 is a graph showing a characteristic between a drive frequency and a phase difference in the second embodiment.

FIG. 8 is a graph indicating a relationship between the drive frequency and the phase difference in the case where the phase difference is detected with the circuit shown in FIG. 7. In the circuit in the first embodiment, as shown in FIG. 6, substantially the same characteristic is obtained in the phase difference to the drive frequency regardless of the pulse width. In this embodiment, the phase difference with the periodic signal is measured using the pulse signal outputted from the pulse generation circuit 2, so that the phase difference information includes a phase delay in the driver circuit 3. The phase delay in the driver circuit 3 changes according to the pulse width, with the result that, as shown in FIG. 8, the phase difference characteristic changes according to the pulse width.

In the characteristic shown in FIG. 8, the phase difference is 120° (non-drive state) to 300° (resonant drive state). This is because the polarities of the input signals of the comparator 8 are opposed to those in the first embodiment as described above. If the polarities are not reversed, the phase difference characteristic appears at vicinities of 360°, so that the phase difference detection circuit 9 malfunctions.

As described above, in this embodiment, the phase difference characteristic changes according to the set pulse width. Therefore, when the phase difference is detected and determined, it is necessary to change a threshold value serving as a determination reference of the detected phase difference according to the set pulse width. In order to realize this, it is recommended that table data in which the pulse width and the threshold value of the phase difference correspond to each other be stored in advance in a memory (not shown) provided inside or outside the CPU 1. For example, it is recommended that a first phase difference Pd1 be stored corresponding to a narrow pulse width, a second phase difference Pd2 be stored corresponding to a middle pulse width, and a third phase difference Pd3 be stored corresponding to a wide pulse width.

Figure 9:
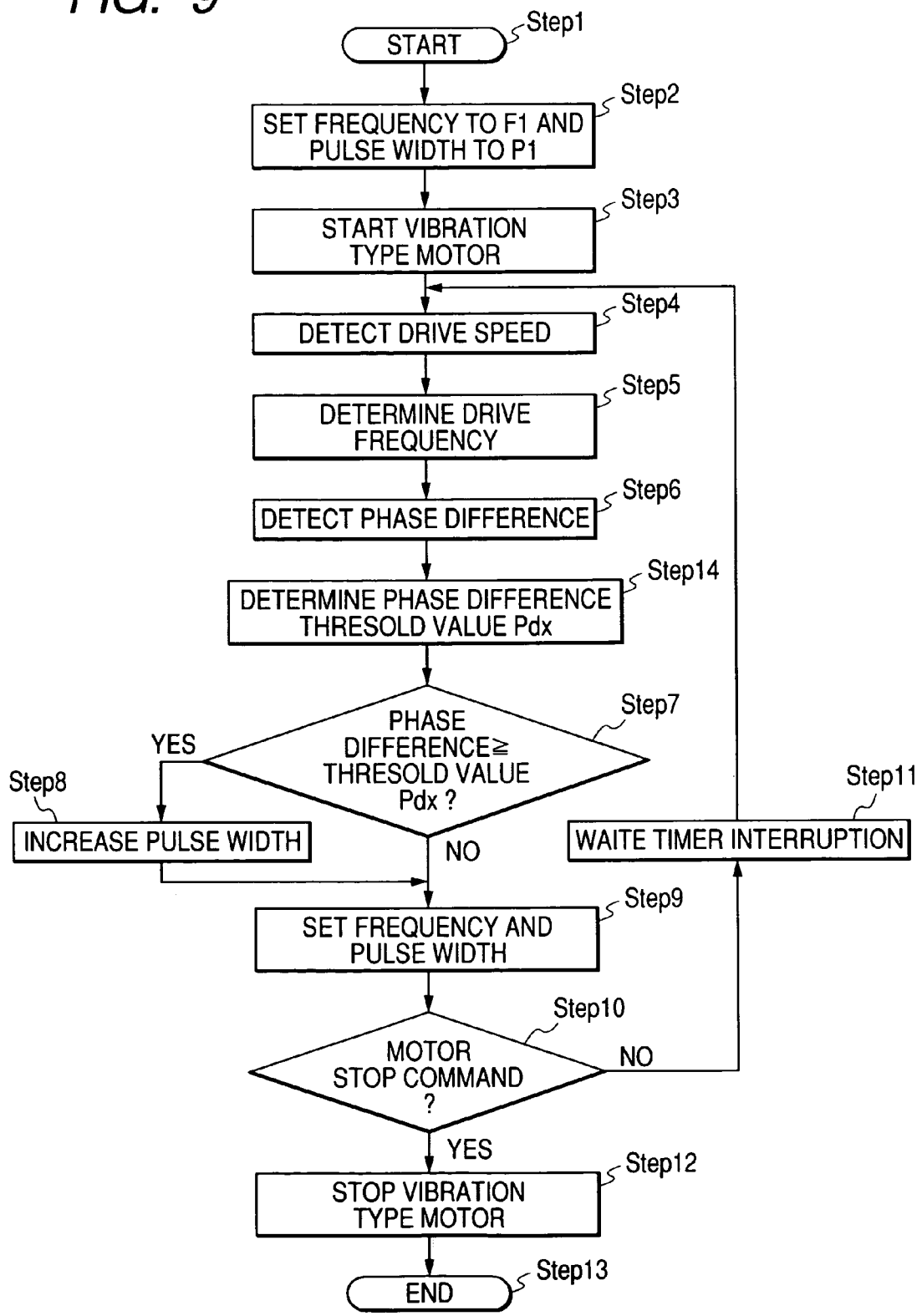
FIG. 9 is a flow chart showing a control procedure of the control circuit according to the second embodiment.

FIG. 9 is a flow chart indicating control contents executed by the CPU 1 in this embodiment. In this flow chart, the same references as those in the first embodiment are provided for the same content steps as those in the first embodiment.

In FIG. 9, when the execution of the flow is started in Step 1, the CPU 1 sets the drive frequency f1 at start and the pulse width P1 at start to the pulse generation circuit 2 in Step 2. The drive frequency f1 at start and the pulse width P1 at start are determined by the same method as in the first embodiment.

Next, in Step 3, the start command for the vibration type motor 4 is provided to the pulse generation circuit 2. Then, in Step 4, the drive speed information on the vibration type motor 4 is detected from the speed detection circuit 6. In Step 5, the drive frequency is determined based on the detected drive speed information. The drive frequency is determined by the same method as in the first embodiment. Next, in Step 6, the phase difference information is detected from the phase difference detection circuit 9.

Here, in Step 14, a threshold value Pdx (for example, x=1 to 3) of the phase difference corresponding to the pulse width at that time is obtained from the table data stored in the memory. Next, in Step 7, the threshold value Pdx obtained in Step 14 is compared with the phase difference information detected in Step 6. When the phase difference information is equal to or larger than the threshold value Pdx (that is, when the phase difference is a value indicating the low frequency drive state closer to the resonant drive state than the drive state indicated by Pdx), the pulse width is increased by a predetermined pulse width in Step 8. Here, as in the first embodiment, the upper limit of the pulse width is set to 50% in duty ratio. Then, the flow of the processing goes to Step 9 and the increased pulse width and the drive frequency determined in Step 5 are set to the pulse generation circuit 2.

In Step 7, when the phase difference information is smaller than the threshold value Pdx (that is, the phase difference is a value indicating the high frequency drive state farther away from the resonant drive state than the drive state indicated by Pdx), the flow of the processing directly goes to Step 9. The pulse width P1 set in Step 2 and the drive frequency determined in Step 5 are set to the pulse generation circuit 2.

Then, whether or not the motor stop command is outputted from an external operating circuit or the like is detected in Step 10. When the motor stop command is not outputted, the flow of the processing goes to Step 11. In this embodiment, the operation of the vibration type motor 4 is controlled every predetermined cycle in response to the timer interruption of the CPU 1 as in the first embodiment. Therefore, in Step 11, the operation is temporarily stopped until a next timer interruption timing. When the motor stop command is outputted in Step 10, the vibration type motor 4 is stopped in Step 12.

As described above, according to the second embodiment, even when the circuit in which the phase difference characteristic changes in accordance with the pulse width (voltage of the periodic signal) is used, the same effect as that in the first embodiment is obtained. In this embodiment, a description has been given of the case where the threshold value Pdx of the phase difference corresponding to the pulse width at that time is determined based on the table data stored in the memory in Step 14 shown in FIG. 9. However, the present invention is not limited to this case. The threshold value Pdx may be determined using a calculation expression based on a value of the pulse width.

Third Embodiment

In the first embodiment described above, a description has been given of the control in which the pulse width at start is set to a small value and then the pulse width is increased according to the detected phase difference. However, when a load reduces during motor driving, the drive frequency becomes higher because of the frequency control for maintaining the target speed. In such a case, when a state in which the pulse width is wide is being maintained, the waste power consumption is likely to increase. Thus, in this embodiment, in order to solve the above-mentioned problem, the first embodiment is improved. The control circuit has the same structure as that shown in FIG. 2 in the first embodiment. Hereinafter, in the description, the same references as those in the first embodiment are provided for the same constituent elements. Here, only control contents executed by the CPU 1 will be described with reference to FIG. 10.

Figure 10:
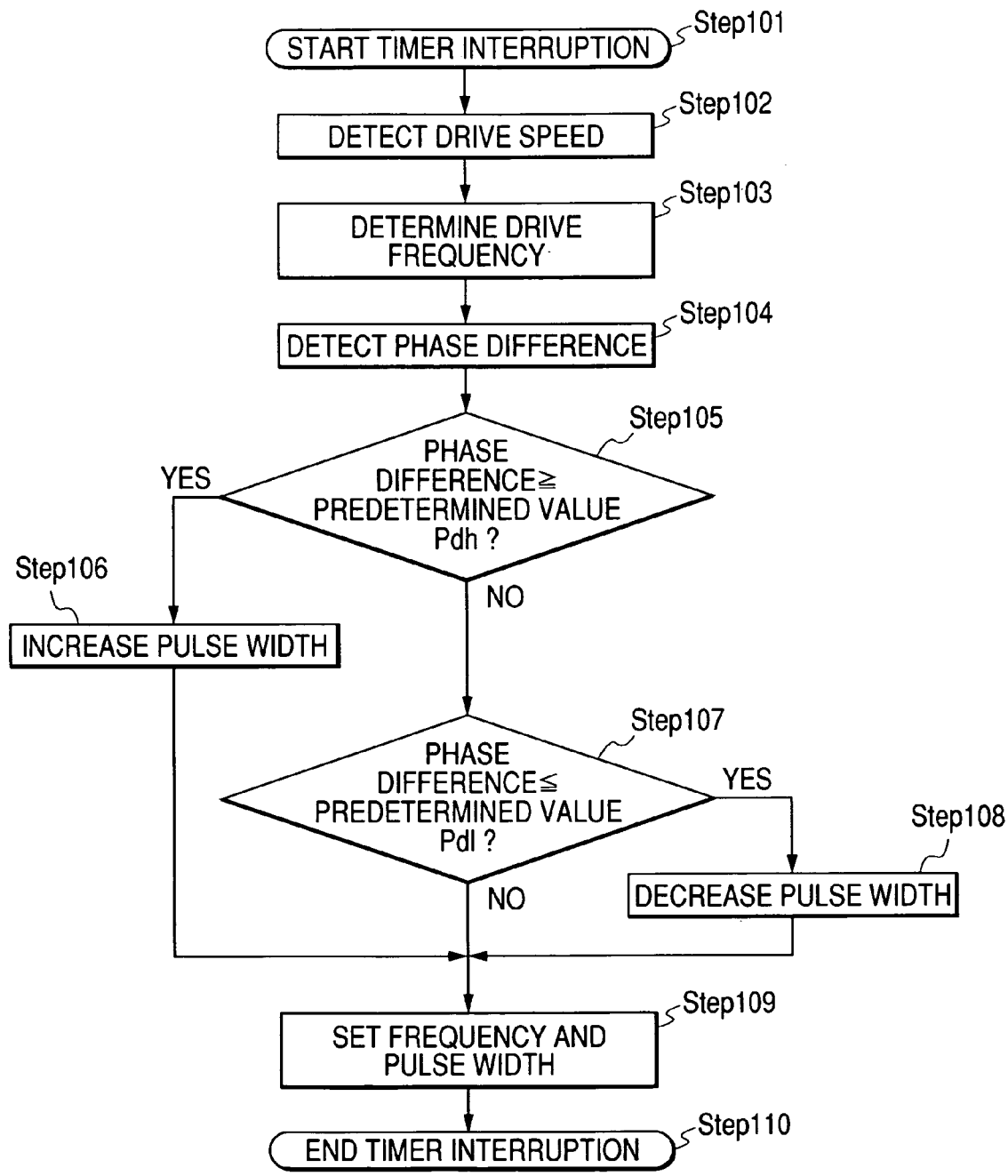
FIG. 10 is a flow chart showing a control procedure of a control circuit according to a third embodiment of the present invention.

In a flow chart shown in FIG. 10, the flow of the processing starts from a state of constant speed control after the drive speed of the vibration type motor 4 reaches a predetermined speed (target speed). The constant speed control is performed at intervals of the timer interruption of the CPU 1. Hereinafter, the flow from the generation of the timer interruption to the end of the timer interruption processing will be described.

When the timer interruption is generated in Step 101, the CPU 1 detects the drive speed information from the speed detection circuit 6 in Step 102. In Step 103, the drive frequency is determined based on the detected drive speed information. The drive frequency is determined by the same method as in the first embodiment. Assume that the pulse width at that time is a pulse width (second voltage of the periodic signal) wider than the pulse width P1 at start as described in the first embodiment.

In Step 104, the phase difference information is detected from the phase difference detection circuit 9. Then, in Step 105, whether or not the phase difference information is equal to or larger than the predetermined value (first phase difference) Pdh is determined. Here, as described in the first embodiment, as shown in FIG. 6, the phase difference Pdh is a phase difference obtained at the time when the vibration type motor 4 is driven at a slightly high frequency than the resonant frequency. That is, Pdh is a value closer to the phase difference indicating the resonant drive state than the phase difference indicating the non-drive state.

When it is determined in Step 105 that the phase difference information is equal to or larger than Pdh, the pulse width is increased by a predetermined pulse width in Step 106. Then, the flow of the processing goes to Step 109. When it is determined in Step 105 that the phase difference information is smaller than Pdh, the flow of the processing goes to Step 107.

In Step 107, whether or not the phase difference information is equal to or smaller than Pd1 (second phase difference) is determined. Here, as shown in FIG. 6, the phase difference Pd1 is set as a value closer to a phase difference indicating the high frequency drive state than the phase difference Pdh. That is, Pd1 is a phase difference obtained at the time when the vibration type motor 4 is driven at a frequency from which the tendency that the power consumption does not significantly reduces begins to appear even if the drive frequency is increased and the drive speed is reduced.

When it is determined in Step 107 that the phase difference information is equal to or smaller than Pd1 (value closer to the phase difference indicating the high frequency drive state than Pd1), the pulse width is reduced by a predetermined pulse width in Step 108. A pulse width determined at this time may be equal to or different from the pulse width P1 at start as described in the first embodiment. Then, the flow of the processing goes to Step 109. When it is determined in Step 107 that the phase difference information is not equal to or smaller than Pd1, the flow of the processing directly goes to Step 109.

In Step 109, the drive frequency determined in Step 103 and the pulse width obtained in Step 106 or Step 108 or the pulse width set in advance are set to the pulse generation circuit 2.

After that, the interruption operation is ended in Step 110. Therefore, the determined drive frequency and the obtained or set pulse width are maintained for driving until the next timer interruption is generated.

As described above, in this embodiment, when a load state of the motor changes while the constant speed control is performed after the start of the motor is ended, the pulse width is adjusted. That is, when the motor has a margin of output to the load, the pulse width is reduced. When the motor has no margin of output, the pulse width is increased. Thus, the power consumption is reduced according to the load state of the motor.

Note that the predetermined value Pd1 in this embodiment may be also changed according to the pulse width (voltage of the periodic signal) as in the second embodiment.

Fourth Embodiment

In the respective embodiments described above, the drive frequency of the vibration type motor 4 is determined according to the drive speed thereof, and then the pulse width is determined according to the detected phase difference. In this time, when the load is significantly increased or when the vibration type motor 4 cannot be driven at a desirable target speed owing to the deterioration of the output performance thereof, the drive frequency provided for the vibration type motor 4 may become lower than the resonant frequency to reduce the drive speed.

In this embodiment, in order to solve the above-mentioned problem, the third embodiment is improved. The control circuit has the same structure as that in the third embodiment (first embodiment) and therefore the detail description is omitted here. Hereinafter, only control contents executed by the CPU 1 will be described according to a flow chart shown in FIG. 11. In this flow chart, the same references as those in the third embodiment are provided for the same content steps as those in the third embodiment.

Figure 11:
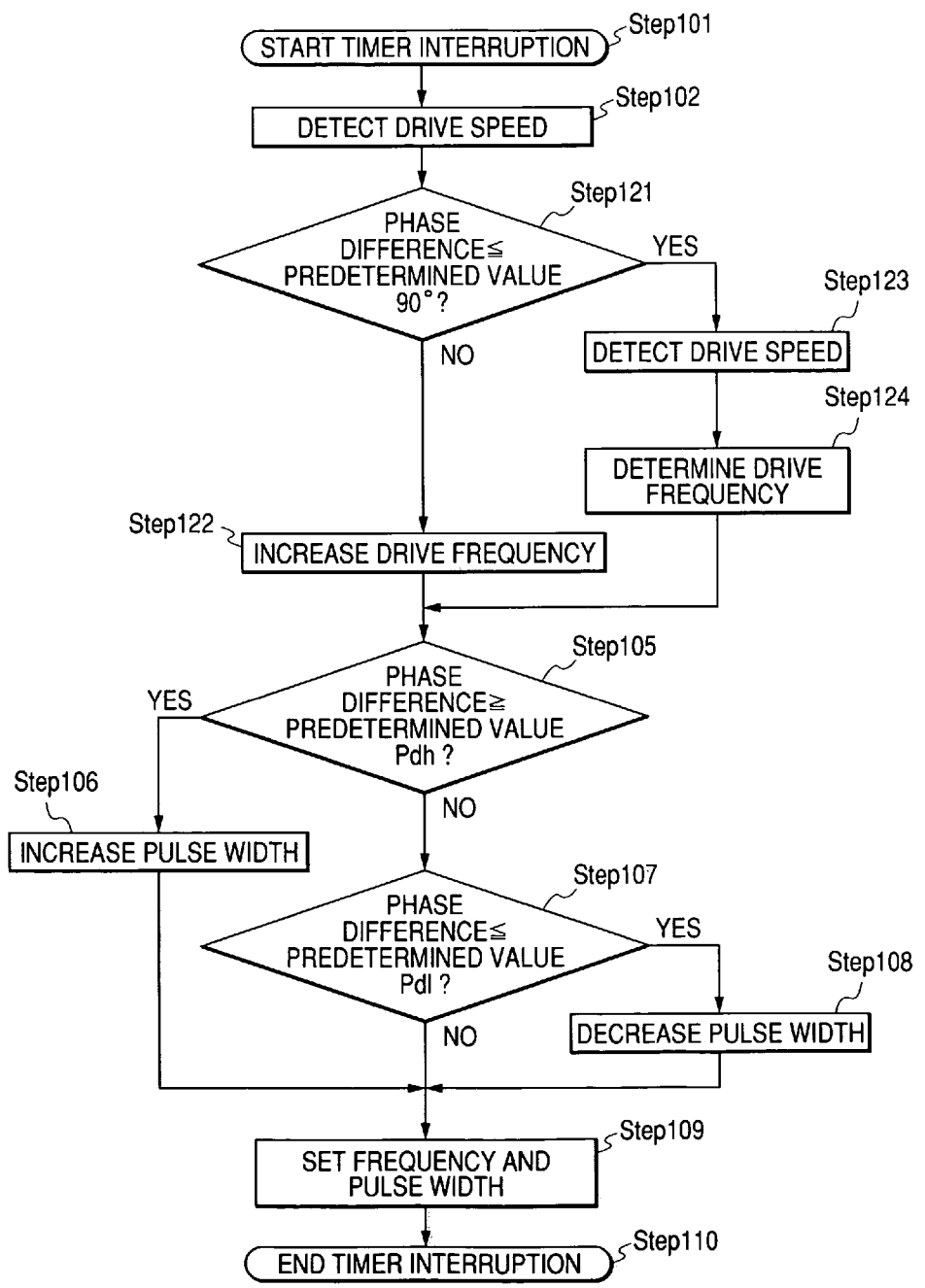
FIG. 11 is a flow chart showing a control procedure of a control circuit according to a fourth embodiment of the present invention.

In FIG. 11, when the timer interruption is generated in Step 101, the CPU 1 detects the phase difference information from the phase difference detection circuit 9 in Step 102.

Next, in Step 121, whether or not the detected phase difference information is equal to or smaller than 90° is determined. As described above, when the vibration type motor 4 is driven at the resonant frequency, the phase difference becomes 90°. In the case where the phase difference is larger than 90°, even when the drive frequency of the vibration type motor 4 is reduced, the drive speed of the vibration type motor 4 does not increase. Therefore, in the case where the phase difference is larger than 90°, the drive frequency is increased in Step 122 such that the drive frequency becomes larger than the resonant frequency. Then, the flow of the processing goes to Step 105.

On the other hand, when it is determined that the phase difference information is equal to or smaller than 90°, the drive speed information is detected from the speed detection circuit 6 in Step 123. In Step 124, the drive frequency is determined based on the detected drive speed information. The drive frequency is determined by the same method as in the third embodiment (first embodiment). Then, the flow of the processing goes to Step 105.

In Step 105, whether or not the phase difference information is equal to or larger than the predetermined value Pdh is determined. When the phase difference information is equal to or larger than Pdh, the pulse width is increased by a predetermined pulse width in Step 106. Then, the flow of the processing goes to Step 109. When the phase difference information is not equal to or larger than Pdh, the flow of the processing goes to Step 107.

In Step 107, whether or not the phase difference information is equal to or smaller than Pd1 is determined. When the phase difference information is equal to or smaller than Pd1, the pulse width is reduced by a predetermined pulse width in Step 108. Then, the flow of the processing goes to Step 109. Note that the predetermined values Pdh and Pd1 are equal to those in the third embodiment. When the phase difference information is not equal to or smaller than Pd1, the flow of the processing directly goes to Step 109.

In Step 109, the drive frequency determined in Step 122 or Step 124 and the pulse width obtained in Step 106 or Step 108 or the pulse width set in advance are set to the pulse generation circuit 2. After that, the interruption operation is ended in Step 110.

As described above, in this embodiment, whether or not the phase difference information is equal to or smaller than 90° is determined before the drive frequency is determined. When the phase difference information is larger than 90° (when the drive state is closer to the low frequency drive state than the resonant drive state), the drive frequency is increased. When the phase difference information is equal to or smaller than 90° (when the drive state is closer to the high frequency drive state than the resonant drive state), the drive frequency is determined according to the drive speed. Therefore, even when the load significantly increases or the output performance of the vibration type motor 4 deteriorates, the vibration type motor 4 is driven at a speed closer to a maximum speed that can be outputted at that time without stopping the vibration type motor 4.

In this embodiment, When the phase difference information is larger than 90°, the drive frequency is surely increased in Step 122. However, the drive frequency may be maintained without changing (that is, a reduction in drive frequency may be inhibited or limited).

Fifth Embodiment

The operation of the CPU 1 in the case where the target speed is set to a reduced value while the vibration type motor 41 is being driven will be described with reference to a flow chart shown in FIG. 12. In this embodiment, deceleration control opposed to the acceleration control described in the first embodiment will be described. The control circuit has the same structure as that in the first embodiment and therefore the detail description is omitted here.

Figure 12:
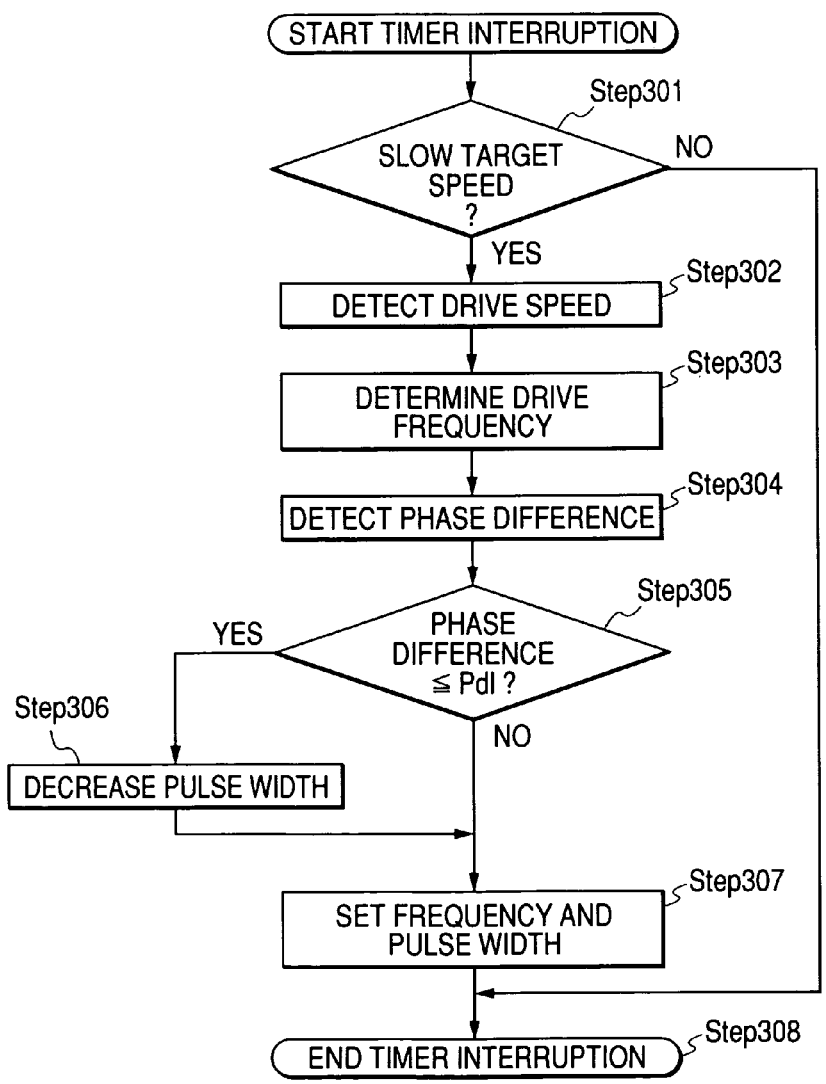
FIG. 12 is a flow chart showing a control procedure of a control circuit according to a fifth embodiment of the present invention.

In FIG. 12, when the timer interruption is generated in Step 301, the CPU 1 detects the drive speed information from the speed detection circuit 6 in Step 302. In Step 303, the drive frequency is determined based on the detected drive speed information. The drive frequency is determined by the same method as in the first embodiment. Then, the flow of the processing goes to Step 304.

In Step 304, the phase difference information is detected from the phase difference detection circuit 9. Then, in Step 305, whether or not the detected phase difference information is equal to or smaller than the predetermined value Pd1 is determined. When the phase difference information is equal to or smaller than Pd1, the pulse width is reduced by a predetermined pulse width in Step 306. Then, the flow of the processing goes to Step 307. When the phase difference information is not equal to or smaller than Pd1, the flow of the processing directly goes to Step 307.

In Step 307, the drive frequency determined in Step 303 and the pulse width obtained in Step 306 or the pulse width set in advance are set to the pulse generation circuit 2. After that, the interruption operation is ended in Step 308.

As described above, in this embodiment, in the case where the target speed is set to the reduced value while the vibration type motor 4 is being driven, when the phase difference information is equal to or smaller than the predetermined value Pd1, the pulse width is reduced. Thus, the power consumption can be reduced.

This application claims priority from Japanese Patent Application No. 2003-334186 filed on Sep. 25, 2003, which is hereby incorporated by reference herein.

What is claimed is:

1. A control apparatus for a vibration type actuator, which excites vibration in an elastic member to relatively drive the elastic member and a contact member which is in contact with the elastic member by applying a periodic signal to an electromechanical energy conversion element, the control apparatus comprising:
a signal generation unit adapted to generate the periodic signal;
a vibration detection unit adapted to detect a vibration state of the elastic member;
a phase difference detection unit adapted to detect a phase difference between the periodic signal generated by the signal generation unit and an output signal from the vibration detection unit;
a speed detection unit adapted to detect a drive speed of the contact member; and
a control unit adapted to control a frequency and a voltage of the periodic signal generated by the signal generation unit,
wherein the control unit decreases the frequency of the periodic signal without varying the voltage of the periodic signal so that the drive speed of the contact member approaches a target speed, in a case that the speed of the contact member detected by the speed detection unit is less than the target speed, and
increases the voltage of the periodic signal without varying the frequency of the periodic signal, in a case that the phase difference detected by the phase difference detection unit reaches a first phase difference before the drive speed of the contact member reaches the target speed by the decreasing of the frequency of the periodic signal.

2. A control apparatus for a vibration type actuator according to claim 1, wherein:
the control unit sets, at a time of starting the drive of the contact member, the voltage of the periodic signal to a first value at which the drive speed of the contact member does not reach the target speed even when the elastic member of the vibration type actuator becomes a resonant drive state.

3. A control apparatus for a vibration type actuator according to claim 1, wherein the control unit changes the first phase difference in accordance with the voltage of the periodic signal.

4. A control apparatus for a vibration type actuator according to claim 2, wherein the control unit changes the voltage of the periodic signal to a second value higher than the first value without varying the frequency of the periodic signal, in the case that the phase difference detected by the phase difference detection unit reaches the first phase difference before the drive speed of the contact member reaches the target speed by the decreasing of the frequency of the periodic signal, and
in a case that the voltage of the periodic signal is set to the second value, the phase difference detection unit detects a shift of operation away from the resonant drive state of the elastic member when the phase difference detected by the phase difference detection unit reaches a second phase difference.

5. A control apparatus for a vibration type actuator according to claim 4, wherein the control unit changes the second phase difference in accordance with the voltage of the periodic signal.

6. A control apparatus for a vibration type actuator according to claim 1, wherein:
the signal generation unit comprises a pulse generation portion adapted to generate a pulse signal and a driver portion adapted to generate the periodic signal from the pulse signal; and
the control unit changes a pulse width of the pulse signal to control the voltage of the periodic signal.

7. A vibration type actuator apparatus, comprising:
the control apparatus according to any one of claims 1; and
a vibration type actuator as a drive source, the vibration type actuator being controlled by the control apparatus.

8. A method of controlling a vibration type actuator, which excites vibration in an elastic member to relatively drive the elastic member and a contact member which is in contact with the elastic member by applying a periodic signal to an electromechanical energy conversion element, the method comprising the steps of:
detecting a vibration state of the elastic member;
detecting a phase difference between one of the periodic signal and a signal for generating the periodic signal and a detection signal indicating the vibration state;
detecting a drive speed of the contact member; and
controlling a frequency and voltage of the periodic signal,
wherein the controlling step decreases the frequency of the periodic signal without varying the voltage of the periodic signal so that the drive speed of the contact member approaches a target speed, in a case that the detected speed of the contact member is less than the target speed, and
increases the voltage of the periodic signal without varying the frequency of the periodic signal, in a case that the detected phase difference reaches a first phase difference before the drive speed of the contact member reaches the target speed by the decreasing of the frequency of the periodic signal.

9. A method of controlling a vibration type actuator according to claim 8, wherein:

the controlling step sets, at a time of starting the drive of the contact member, the voltage of the periodic signal to a first value at which the drive speed of the contact member does not reach the target speed even when the elastic member of the vibration type actuator becomes a resonant drive state.

10. A method of controlling a vibration type actuator according to claim 8, wherein the controlling step comprises changing the first phase difference in accordance with the voltage of the periodic signal.

11. A method of controlling a vibration type actuator according to claim 9, wherein the controlling step changes the voltage of the periodic signal to a second value higher than the first value without varying the frequency of the periodic signal, in the case that the detected phase difference reaches the first phase difference before the drive speed of the contact member reaches the target speed by the decreasing of the frequency of the periodic signal, and in a case that the voltage of the periodic signal is set to the second value, a shift of operation away from the resonant drive state of the elastic member is detected when the detected phase difference reaches a second phase difference.

12. A method of controlling a vibration type actuator according to claim 11, wherein the controlling step comprises changing the second phase difference in accordance with the voltage of the periodic signal.

* * * * *

UNITED STATES PATENT AND TRADEMARK OFFICE
CERTIFICATE OF CORRECTION

PATENT NO. : 7,183,691 B2  
APPLICATION NO. : 10/940719  
DATED : February 27, 2007  
INVENTOR(S) : Yamamoto Page 1 of 1

It is certified that error appears in the above-identified patent and that said Letters Patent is hereby corrected as shown below:

COLUMN 3:
Line 58, "actual," should read -- actuality, --;

COLUMN 6:
Line 2, "form" should read -- from --;

COLUMN 12:
Line 54, "When" should read -- when --.

COLUMN 14:
Line 39, "claims 1;" should read -- claims 1 to 6; --.

Signed and Sealed this

Eleventh Day of March, 2008

JON W. DUDAS  
*Director of the United States Patent and Trademark Office*